United States Patent

[11] 3,599,113

| | | |
|---|---|---|
| [72] | Inventor | Gregor Cremosnik<br>Zurich, Switzerland |
| [21] | Appl. No. | 26,566 |
| [22] | Filed | Apr. 8, 1970 |
| [45] | Patented | Aug. 10, 1971 |
| [73] | Assignee | Werkzegmaschinenfabrik Oerlikon-Buhrle AG<br>Zurich, Switzerland |
| [32] | Priority | Apr. 25, 1969 |
| [33] | | Switzerland |
| [31] | | 6293/69 |

[54] LASER DEVICE
6 Claims, 2 Drawing Figs.

| | | |
|---|---|---|
| [52] | U.S. Cl. | 331/94.5 |
| [51] | Int. Cl. | H01s 3/02 |
| [50] | Field of Search | 331/94.5; 330/4.3 |

[56] References Cited
UNITED STATES PATENTS

| | | | |
|---|---|---|---|
| 3,440,558 | 4/1969 | Cameron | 331/94.5 |
| 3,455,666 | 7/1969 | Bazinet, Jr. | 331/94.5 |
| 3,516,011 | 6/1970 | Hadwin | 331/94.5 |

*Primary Examiner*—William L. Sikes
*Attorney*—Wenderoth, Lind and Ponack

ABSTRACT: A laser device with a glass tube of elliptical cross section. A laser rod and a rod-shaped light source are each located on a line passing through a respective focus of the ellipse parallel to the longitudinal axis of the glass tube. A reflecting film covers the outer surface of the glass tube, and a protective film of thermally conductive material covers the reflective film. A metal body having cooling fins surrounds the the outer surface of the protective film. A coolant such as water is passed through the glass tube and the refractive index of the coolant is substantially equal to that of the glass in the tube.

PATENTED AUG 10 1971 3,599,113

GREGOR CREMOSNIK, inventor

By Wendroth, Lind & Ponack
Attorneys

LASER DEVICE

The invention relates to a laser device of the type including a glass tube of elliptical cross section which in use is traversed by a coolant and which tube is provided with a reflecting film. A laser rod and a rod-shaped light source, are each located in a line passing through a respective focus of the ellipse parallel to the longitudinal axis of the tube.

In a known laser device of this type a stream of nitrogen gas is conducted through the glass tube. As the efficiency of a laser of such a type substantially depends upon the loss in intensity due to absorption and reflection of the light on its path between the light source and the laser rod, the laser rod is situated so as to be directly exposed to the gas stream. In addition the interior of the glass tube is provided with a metallic reflecting film. This laser device does not permit an oxygen containing gas or liquid to be used as a coolant as this would oxidize and thus spoil the metallic reflecting film.

It is therefore the object of the present invention to construct a laser which avoids the drawbacks of this known device and which is at the same time no less efficient.

The invention achieves this object by placing the reflecting film on the outside of the glass tube, by using as a coolant a liquid having a refractive index substantially equal to that of the glass tube, and by protecting the reflecting film with a thermally conductive covering film.

An embodiment of the invention will be hereunder more particularly described with reference to the drawings in which.

Figure 1:
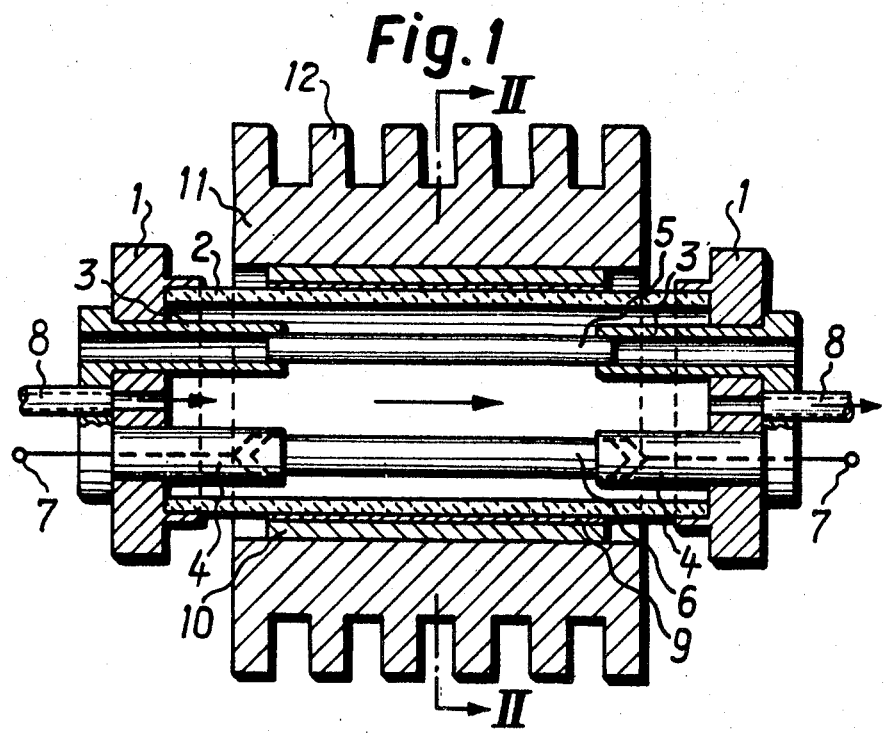
FIG. 1 is an axial section of an embodiment of a laser device according to the invention.
Figure 2:
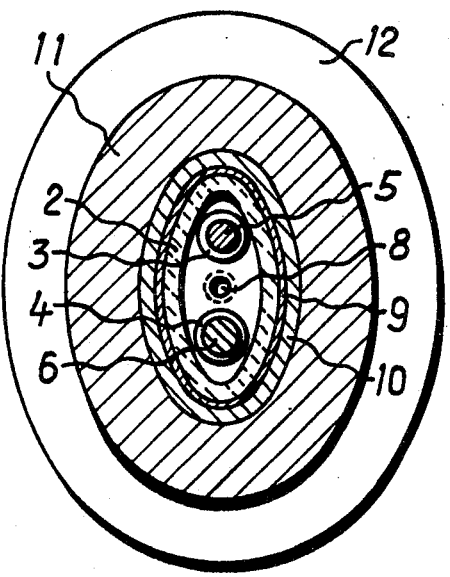
FIG. 2 is a section on the line II–II of FIG. 1.

With laser to the drawings, a glass tube 2 of elliptical cross section is fused to two metal flanges 1. Each of the flanges 1 is fitted coolant mounts 3 and 4 for locating respectively a laser rod 5 and a rod-shaped light source 6. The rod 5 and the source 6 are each located on a line passing through a respective focus of the ellipse parallel to the longitudinal axis of the tube. The laser rod 5 and the light source 6 are thus located parallel to one another. Electrical connections 7 for the light source 6 are passed to the outside of the tube 2 through the mounts 4 and the flanges 1. Moreover, through an opening 8 in each of the flanges 1 a coolant can enter and leave the interior of the glass tube. As it flows through the glass tube 2 the coolant immerses the laser rod 5 as well as the light source 6. The external surface of the glass cylinder 2 is optically polished and provided with a metallic light reflecting film 9 which may be applied for instance to vapor deposition. In order to protect this metallic light reflecting film 9 from oxidation and also to improve its heat dissipation properties, the metallic light reflecting film 9 is covered by another, thicker vaporized film 10 of a metal of high thermal conductivity, such as copper. A hollow cylindrical metal body 11 formed with external cooling fins 12 is pressed onto the outer protective metal film 10. This metal body 11 is also preferably made of copper to ensure a high rate on heat dissipation. The illustrated device functions as follows:

Owing to the location of the laser rod 5 and of the light source 6 on a line passing through a respective focus of ellipse parallel to the longitudinal axis of the tube 2, which also forms a reflector, the light emitted by the light source 6, reduced by losses sustained by absorption and reflection, is recombined in the laser rod 5. The actual loss sustained by absorption is determined by the nature of the medium through which the light passes and by the length of its path through the medium. Assuming that the coolant used is pure water the absorption losses in the spectral range of light sources suitable for exciting lasers are practically negligible. The reflective losses are determined by the difference between the indices of refraction of the materials at the interface through which the light passes. The ratio of the intensity of the reflected light $I_r$ to that of the incident light $I_e$ is $$\frac{Ir}{Ie} = \left(\frac{n_1 - n_2}{n_1 + n_2}\right)^2$$

When the light passes from glass ($n_1$=1.5) into air ($n_2$=1.0), as occurs in the conventional laser device, the intensity loss of the light is found to be 4 percent. The same intensity loss is experienced when the light passes back from air into glass.

In the laser arrangement according to the present invention the light passes only from the coolant (say water, $m$=1.33) into the glass cylinder ($n$ about 1.5) and conversely. The reflection loss which then occurs is very small and amounts to only about 0.35 percent of the emitted light. Part of the light emitted by the light source 6 reaches the laser rod 5 directly passing only through the coolant. There is substantially no loss in this part of the light.

It is also feasible to insert the glass tube 2 containing the light source 6 and the laser rod 5 into a conventional reflector casing, in which case the glass cylinder 2 would lack the vaporized films 9 and 10. Even such a laser construction offers considerable advantages over hitherto known laser arrangements.

I claim:

1. A laser device comprising a glass tube of elliptical cross section, a laser rod and a rod-shaped light source each located on a line passing through a respective focus of the ellipse parallel to the longitudinal axis of the tube, a reflecting film covering the outer surface of the glass tube, and a protective film of thermally conductive material covering the reflective film.

2. A laser device according to claim 1 wherein means are provided for passing a coolant through said glass tube and the refractive index of said coolant is substantially equal to that of the glass in said tube.

3. A laser device according to claim 2, in which the coolant is water.

4. A laser device according to claim 1 wherein a metal body having cooling fins surrounds the outer surface of said protective film.

5. A laser device as set forth in claim 1 wherein said protective film is copper.

6. A laser device as set forth in claim 4 wherein said metal body having cooling fins is copper.